United States Patent Office 3,278,560
Patented Oct. 11, 1966

3,278,560
POLYGLYCIDYLPOLYAMINE COMPOUNDS
Van R. Gaertner, Ballwin, Mo., assignor to Monsanto Company, a corporation of Delaware
No Drawing. Filed July 25, 1962, Ser. No. 212,438
4 Claims. (Cl. 260—348)

This invention relates to a series of polyamine compounds and to compositions thereof. More particularly, this invention provides new and useful derivatives of polyalkyleneamines.

Another object of this invention is to provide polyglycidylpolyamine compounds, and mineral acid salts thereof.

An object of this invention is to provide new hydrophobic alkyl, alkenyl, and alkyl-substituted aryl polyglycidylpolyamines.

Another object of this invention is to provide methods for sizing paper without need of curing at elevated temperatures.

Another object of this invention is to provide methods for rendering textile materials water-repellent in an improved manner.

Other aspects, objects, and advantages of this invention will be apparent from a consideration of the accompanying disclosure and the appended claims.

It has been found according to this invention that new and valuable polyamine compounds can be prepared by contacting and reacting an amine of the formula

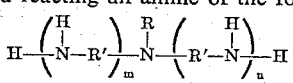

wherein R is selected from the group consisting of alkyl radicals having from 10 to 25 carbon atoms, alkenyl radicals having from 10 to 25 carbon atoms, and alkyl-substituted aryl radicals having from 10 to 25 carbon atoms in the alkyl substituent, $n$ plus $m$ equals a whole number integer having a total of from 1 to 6, $n$ is at least 1, and $m$ is a whole number integer of from 0 to 5, and each R' denotes a bivalent alkylene radical having from 2 to 6 carbon atoms, with an epihalohydrin such as epichlorohydrin, epibromohydrin, and epiiodohydrin. The resulting reaction products are valuable as intermediates for preparing polyglycidylpolyamines.

According to one aspect of this invention, there are provided, as new compounds, polyglycidylpolyamines of the formula

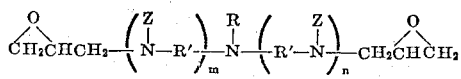

wherein R, is selected from a group consisting of alkyl radicals having from 10 to 25 carbon atoms, alkenyl radicals having from 10 to 25 carbon atoms, alkyl-substituted phenyl, and biphenylyl radicals having from 10 to 25 carbon atoms in the alkyl substituents R' is a bivalent alkylene radical having from 2 to 6 carbon atoms, $n$ plus $m$ equals a whole number of from 1 to 6, $n$ is a whole number of at least 1, $m$ is a whole number of from 0 to 5, and Z is selected from the group consisting of hydrogen, and the radical

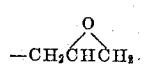

and at least a substantial number of the Z radicals are the radical

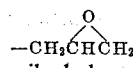

The compounds described above may be prepared and recovered as such, or as the mineral acid salts of said compounds, which are included in the embodiments of this invention.

Compounds described by the above general formula are prepared first by the reaction of an epihalohydrin such as epibromohydrin, epichlorohydrin, or epiiodohydrin with an amine of the formula

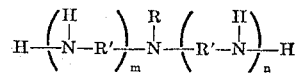

wherein R, R', $m$ and $n$ are as defined above. Following this, the reaction product can be contacted and reacted with an aqueous basic material to dehydrohalogenate the resulting intermediate to obtain as a reaction product, a compound with the general formula above. By dehydrohalogenation is meant the reaction of the basic material with the intermediate in such a way as to remove hydrogen halide therefrom, causing the formation of the glycidyl oxirane linkage, and a by-product which is the salt of the base and hydrogen halide given off in the reaction.

For preparing the intermediates, the polyamine starting material is contacted and reacted with the epihalohydrin in an amount sufficient to form the intermediate reaction product having at least 50 percent of the Z position groups in the product in the form of the halopropanol radical, that is, the radical of the formula

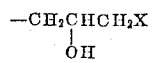

wherein X is the halogen derived from the epihalohydrin used. Sufficient epihalohydrin, generally an excess, is used to form as completely as possible an intermediate product wherein all of the Z positions groups are the halopropanol groups. The epihalohydrin reactant generally reacts preferentially with hydrogen atoms bonded to nitrogen atoms having two such hydrogen atoms, that is, with primary amine nitrogen hydrogens, and then more slowly with the hydrogens bonded to secondary nitrogen atoms, that is, with nitrogen atoms having two carbon bonds. The amount of epihalohydrin used for a given molar amount of the amine starting material will depend to some extent on the amount or degree of reaction desired. For most applications, an excess amount of epihalohydrin sufficient to replace all such hydrogen atoms bonded to nitrogen atoms is used. However, as a practical matter it is generally quite difficult to obtain complete replacement of all such hydrogen atoms with halopropanol groups. Satisfactory products are obtained for polysaccharide treatment purposes when at least 50 percent of hydrogens in the Z positions in the product are replaced with the halopropanol groups.

The reaction between the amine and the epihalohydrin starting material is conducted in the presence of at least a trace amount of an hydroxyl-containing material, preferably a low molecular weight, volatile alkanol, such as methanol, ethanol, or propanol, which can be used as solvent for the reaction mixture as well the the reaction initiator. The hydroxyl-containing material needed to start the reaction can be supplied in a variety of ways. For example, the small amount of water normally present in some commercially available solvents, such as hexane, heptane, etc. is sufficient to initiate the reaction. However, water is not generally desired as the solvent for this reaction mixture. The hydroxyl-containing material can also be supplied by some of the intermediate since, as indicated above, this product contains an hydroxyl group. The hydroxyl-containing material can also be any other hydroxyl compound, a few simple examples of which are phenol, alkylene glycols such as ethylene glycol, propylene glycol, etc. The provision of the hydroxyl-containing material to initiate the reaction is critical in the sense that in its absence the reaction between the epihalohydrin and the amine starting material does not take place. For example, attempts to conduct the reaction using dry hexane as solvent resulted in no product being formed. However, for most purposes the small amount of hydroxyl-containing material needed to initiate the reaction can be supplied by any source such as are indicated above with no other requirements as to type, amount, etc. being critical. Solvents which can generally be used for this step of the process include the hydrocarbons which are relatively low-boiling, readily volatilizable solvents having molecular weights no higher than those approximating hexane, heptane, etc. as well as the lower molecular weight alkanols such as, methanol, ethanol, propanol, isopropanol, butanol, tert-butanol, pentanols, hexanol, and mixtures thereof. The reaction is conducted at low temperatures, generally, on the order of from 0° C. to 50° C. at atmospheric pressure with temperatures of 20°–40° C. being preferred. Time periods ranging from 1 to 100 hours are generally sufficient to afford complete reaction of in excess of 50% of the hydrogen atoms in the Z position on the amine starting material with epihalohydrin. Specific time periods within this range can be optimized by those skilled in the art and will vary depending upon the reactants chosen, the solvent, the molar proportions of the reactants, the temperature used, etc. When the reaction is complete any excess epihalohydrin together with most of any diluent or solvent used is removed at low temperatures not above 50° C., from the reaction product, preferably by distilling or flashing off said materials under reduced pressure. It is not essential to remove all of any diluent or solvent, but it is preferred to remove substantially all of the excess epihalohydrin.

These intermediates are used in preparing the polyglycidylpolyamines. When it is desired to recover said poly(halopropanol)polyamine compounds either for use as such, e.g., as sizing agents, or water-proofing agents, or for storing for later reaction, it is preferred to stabilize said intermediates against undesired reaction in any of various ways. The product can be kept cold, that is, at 0° C. or a lower temperature. It is preferred, however, to stabilize said products by making mineral acid water-soluble salts thereof. The making of water-soluble salts of said products accomplishes several purposes. Besides making the poly(chloropropanol)polyamine products water soluble, the mineral acid salts thereof serves to protect them against undesired reaction, and provides a good mechanism for purifying the intermediate from the reaction mixture of any retained solvent or excess epihalohydrin reactant. Examples of acids which may be used to make the water-soluble salts are the mineral acids, preferably hydrochloric, phosphoric and sulfuric. On the contrary, carboxylic acid salts, such as acetates formed with acetic acid, are detrimental to uses as carbohydrate modifiers. The acid salts of said poly(halopropanol)polyamine products can be made at any convenient time after reaction between the epihalohydrin and the polyamine starting material is complete. Conveniently, the acid material, for example, hydrogen chloride is added to the organic reaction mixture solution before the excess epihalohydrin and solvent or diluent used is removed from the poly(halopropanol)polyamine product. Then, after removing any excess epihalohydrin from the reaction mixture, the resulting acid salt product, e.g., the hydrochloride salt product, may be separated from the reaction mixture by adding a suitable precipitating agent, e.g., a dialkyl ether such as ethyl ether which separates the salt as the desired product. By redissolving the salt product and reprecipitating the product with precipitating agent the product can be effectively purified from unwanted diluents. The amount of acid added is generally at least stoichiometrically sufficient to make salts of each nitrogen atom in the product. Generally, a slight excess for such purpose is used.

In preparing compounds of this invention the product resulting from the reaction of epihalohydrin with the amine starting material is contacted with an aqueous basic material to dehydrohalogenate the reaction product, preferably in the presence of a lower dialkyl sulfoxide. The aqueous basic material is generally the oxide, hydroxide, carbonate, or by-carbonate of an alkali metal or alkaline earth metal admixed with water to provide an efficient working basic material. The examples of such basic materials include sodium, potassium, lithium, calcium, barium, strontium, and magnesium oxides, hydroxides, carbonates, and bicarbonates. Most preferred examples are the plentiful, inexpensive basic materials such as sodium hydroxide, potassium hydroxide, sodium and potassium bicarbonates, calcium and magnesium oxides, and mixtures thereof. Aqueous solutions and suspensions of such materials in dilute or concentrated form can be used. Generally, concentrations of the basic material on the order of 0.1 to 15 N can be used with concentrations on the order of those equivalent to 10% to 50% by weight of the basic material, being preferred. To effect the desired dehydrohalogenation of the reaction product of the first step in economically efficient manner, the basic material is preferably used in excess molar proportions, although stoichiometric proportions may be used. The reaction of the second step of the process involves the reaction of the basic materials with the reaction product of the first step of the process and is preferably conducted in the presence of a substantial amount of a dialkyl sulfoxide.

A lower dialkyl sulfoxide is preferably used in the dehydrohalogenation step for preparing any polyglycidylamine product, described above, since its use aids in accomplishing complete dehydrohalogenation, thereby enhancing the yield and purity of the product. I consider the use of a dialkyl sulfoxide essential to the process when the amine starting material is hydrophobic, that is, when R is a long chain alkyl or alkenyl group having, say, some 10 to 25 carbon atoms, or an alkyl-substituted aryl group having, say, a total of at least 10 carbon atoms in the alkyl substituent on the aryl nucleus. Quantities of dialkyl sulfoxides which may be used range from about 10% to large excesses by weight, based on the weight of the reaction product of the first step which is to be dehydrohalogenated. Prefererd quantities of dialkyl sulfoxide are those approximating the weights of the products to be dehydrohalogenated, say, about 90% to 110% based on the weight of the material to be dehydrohalogenated. Examples of dialkyl sulfoxides which may be used are dimethyl sulfoxide, diethyl sulfoxide, dipropyl sulfoxide, diisopropyl sulfoxide, dibutyl sulfoxide, methyl ethyl sulfoxide, ethyl propyl sulfoxide, etc., with dimethyl sulfoxide being preferred. I have found that in the presence of a dialkyl sulfoxide, best results are obtained by employing a slight stoichiometric excess of the basic material, say, from about 1.1 to 1.5 equivalents of the basic material per equivalent of halopropanol moiety in the intermediate at ordinary, moderately decreased, or moderately increased temperatures, for example, at temperatures of from 0 to 60° C. at atmospheric pressure. External heating is normally not employed, although for efficient reaction, for example, when reaction is conducted using dilute aqueous basic material or in the presence of a small excess of a basic material, say, below 25%, it may be desired to operate at slightly elevated temperatures while agitating the reaction mixture for a time of a few minutes to several hours to insure complete reaction.

The reason for the effectiveness of a dialkyl sulfoxide in this step of the process is not established but I believe it to be due to the fact that it promotes rapid complete dehydrohalogenation, avoiding hydroxyl-containing impurities which may initiate polymerization. In any event, with its use I have been able to obtain higher yields, and more readily separable reaction products.

When the dehydrohalogenation reaction is complete the excess basic material and dialkyl sulfoxides are removed. Most of both materials are removed from the polyglycidylamine product by merely separating the resulting aqueous layer from the organic layer. The excess basic material can also be removed by adding an acidic material such as a mineral acid in sufficient amounts to neutralize the excess basic material. Additional small quantities of unreacted basic material are also removed by adding to the organic layer a clarifying absorbent or adsorbent material, such as charcoal, which is acid acting. I prefer to use a combination of such means of base removal. For example, acids such as hydrochloric, phosphoric, sulfuric, nitric acids and other mineral acids may be added to the reaction mixture to partially neutralize unreacted basic material before the aqueous base is separated from the organic layer. Separation of the aqueous and organic phases also removes a large amount of any unreacted base. Then adding a clarifying agent, such as charcoal to the organic layer removes any remaining basic material from the product.

In preparing compounds of this invention the intermediate product, resulting from the addition of an epihalohydrin to the amine nitrogen atoms having hydrogen bonded thereto, is treated with an aqueous basic material as defined above to dehydrohalogenate the halopropanol groups bonded to nitrogen, forming as a reaction product the respective polyglycidylpolyamine product. For example, when aqueous sodium hydroxide is added to N,N,N″,N‴ - tetra(3 - chloro - 2 - hydroxypropyl) - N′-docosyldibutylenetriamine, the resulting reaction product is N,N,N″,N‴ - tetra(2,3-epoxypropyl)-N′-docosylbutylenetriamine.

Compounds of the intermediate type, that is, those compounds obtained by reacting an epihalohydrin with the amine nitrogen atoms having hydrogen bonded thereto are referred to herein generally as poly(halopropanol) polyamines. Examples of such compounds and the reactants from which they are obtained are:

N,N′,N′,-tris(3-chloro-2-hydroxypropyl)-N-(tert-dodecylphenyl)hexylenediamine obtained by reacting N-(4-tert-dodecylphenyl)hexylenediamine with epichlorohydrin;

N,N,N″,N‴-tetra(3-chloro-2-hydroxypropyl(-N′-tetradecyldibutylenetriamine obtained by reacting N′-tetradecyldibutylenetriamine with epichlorohydrin;

N-pentacosyl-N,N′N‴,N″-tetra(3-iodo-2-hydroxypropyl)-diethylenetriamine obtained by reacting N-pentacosyldiethylenetriamine with epiiodohydrin;

N-n-octadecenyl-N,N′N″,N‴-tetra(3-chloro-2-hydroxypropyl)-dipropylenetriamine obtained by reacting N-n-octadecenyl-dipropylenetriamine with epichlorohydrin;

N-(dinonylphenyl)-N,N′,N″,N‴-tetra(3-bromo-2-hydroxypropyl)-dibutylenetriamine obtained by reacting N-(dinonylphenyl)-dibutylenetriamine with epibromohydrin;

N-decyl-N,N′,N‴,N⁗-tetra(3-chloro-2-hydroxypropyl)tripentylenetetramine obtained by reacting N-decyltripentylenetetramine with epichlorohydrin;

N′-(4-pentacosylphenyl)-N,N,N″,N‴,N⁗,-penta(3-chloro-2-hydroxypropyl)tributylenetetramine obtained by reacting N′-(4-pentacosylphenyl)tributylenetetramine with epichlorohydrin;

N″-tridecyl-hexa(3-chloro-2-hydroxypropyl)tetraethylenepentamine obtained by replacing all of the hydrogen atoms bonded to nitrogen in N″-tridecyltetraethylenepentamine with epichlorohydrin;

N″-7-hexadecenyl-penta(3-chloro-2-hydroxypropyl)tetrapropylenepentamine obtained when all but 1 hydrogen atom bonded to nitrogen in N″-(7-hexadecenyl)tetrapropylenepentamine is reacted with epichlorohydrin;

In preparing polyglycidylpolyamines of this invention the respective poly(halopropanol) amines are contacted and reacted with an aqueous basic material preferably in the presence of a dialkyl sulfoxide in the manner described above. As a result of the reaction with the basic material the halogen of the halopropanol groups is removed as the neutral salt in a by-product, and the oxygen atom from the hydroxy group becomes bonded to each of two carbon atoms of the resulting propyl group forming a terminal epoxide group.

For example, by treating N-n-dodecyl-N,N′,N″,N‴, N⁗ - penta(3 - bromo-2-hydroxypropyl)tributylenetetramine with aqueous potassium hydroxide there is obtained N - n - dodecyl-N,N′,N″,N‴,N⁗-penta(2,3-epoxypropyl) tributylenetetramine.

Additional examples of such polyglycidylpolyamine products obtained by treating with aqueous basic material as defined above the corresponding poly(3-halo-2-hydroxypropyl)polyamines are:

N″-tetracosyl-N,N,N′,N‴,N⁗-penta(2,3-epoxypropyl) triethylenetetramine,

N″-nonadecyl-N,N,N′,N‴,N⁗,N‴″-hexa(2,3-epoxypropyl)-tetraethylenepentamine,

N-undecyl-N,N′,N′-tris(2,3-epoxypropyl)pentylenediamine,

N′-hexadecenyl-N,N,N″,N‴-tetra(2,3-epoxypropyl)dipropylenetriamine,

N″-docosenyl-N,N,N′,N‴,N⁗-penta(2,3-epoxypropyl) triethylenetetramine,

N-(4-tert-dodecylphenyl)-N,N′,N′-tris(2,3-epoxypropyl)-propylenediamine,

N-(3-dodecylbiphenylyl)-N,N′,N‴,N⁗-tetra(2,3-epoxypropyl)diethylenetriamine,

N‴-(3,5-dinonylphenyl)-N,N,N′,N⁗,N‴″,-penta(2,3-epoxypropyl)tripropylenetetramine, and N-(3-methyl-4-dodecyl-N,N′,N″, N‴, N⁗, N‴″-hexa(2,3-epoxypropyl)pentaethylenehexamine.

Mixtures of alkyl- and alkenyl-substituted amines i.e., where R is alkyl and alkenyl are likewise useful for preparing compounds of this invention. The alkyl-substituted amines are often derived from the respective alkenylamines by reduction of the unsaturated bond of the alkenyl group. Mixtures of alkyl- and alkenylamines having carbon chains of varying length may also be used. Examples of products obtained from such mixtures are:

A mixture of N-octadecyl- and N-octadecenyl-N,N′,N′-tris(3-chloro-2-hydroxypropyl)ethylenediamines obtained from the use of a mixture of N-octadecyl- and N-octadecenylethylendiamines;

A mixture of N-hexadecyl-, N-hexadecenyl, N-octadecyl-, and N - octadecenyl-N,N′,N″,N‴,N⁗-penta-(3-chloro-2-hydroxypropyl)tripropylenetetramines obtained from the use of a mixture of N-hexadecyl-, N-hexadecenyl-, N-octadecyl-, and N-octadecenyltripropylenetetramines; and a mixture of N″-(alkyl$_{(C_{20}-C_{22})}$-N,N,N′, N‴,N‴ - penta - (3-chloro-2-hydroxypropyl)triethylenetetramine obtained by the use of a mixture of N-(alkyl$_{(C_{20}-C_{22})}$)triethylene-tetramines.

Examples of salts of poly(halopropanol)polyamines described above are:

N,N,N′,N′-tetra(3-chloro-2-hydroxypropyl)propylenediamine disulfate,

N-octadecyl-N,N′,N′-tris(3-chloro-2-hydroxypropyl) ethylenediamine dihydrochloride;

N-docosyl-N,N,N″,N″-tetra(3-bromo-2-hydroxypropyl) dibutylenetrimaine trihydrobromide, N″-hexadecenyl-N,N,N′,N‴,N⁗-penta(3-chloro-2-hydroxypropyl) - triethylenetetramine tetraphosphate, and N-(tert-dodecylphenyl-N,N′,N‴,N⁗-tetra(3-chloro-2-hydroxypropyl)tripropylenetetramine tetrahydrochloride.

The products can contain isomers, where the higher polyalkylenepolyamines are used as the starting materials and when less than 100 percent of the amine hydrogens are replaced by the halopropanol groups in the intermediate products and the respective glycidyl groups in products of this invention. It is not essential to separate the isomeric products or to determine the exact position of the substituent group since such isomers are useful for the same purposes. For example, when tetraethylenepentamine is reacted with sufficient epichlorohydrin to replace all but 1 hydrogen with chloropropanol groups, the product obtained can be a mixture of isomers including N,N,N′,N′′′,N′′′′,N′′′′ - hexa(3-chloro-2-hydroxypropyl) tetraethylenepentamine, N,N,N′,N′′,N′′′′,N′′′′ - hexa(3-chloro-2-hydroxypropyl)tetraethylenepentamine, and N, N,N′′,N′′′,N′′′′,N′′′′-hexa(3 - chloro - 2-hydroxypropyl) tetraethylenepentamine.

A particular embodiment of this invention is to provide polyglycidylpolyamine compounds having a hydrophobic group bonded to a nitrogen atom. These compounds are provided in accordance with this invention by having R denote an alkyl or alkenyl radical of at least ten carbon atoms, or an alkyl-substituted aryl group having at least 10 carbon atoms in the alkyl-substituents on the aryl nucleus. When R is an alkyl-substituted aryl radical it is preferred that the aryl nucleus contain one or two aromatic rings such as phenyl, naphthyl, biphenylyl, etc. with the monocyclic 6-membered aromatic ring being preferred, e.g., phenyl. These compounds having the hydrophobic groups ar particularly valuable in uses as polysacchride modifying agents such as water-proofing agents, sizing agents, etc. for starch- and cellulose-based products. A particular advantage of these compounds is that they provide good paper product sizing properties which cure at room temperature, that is, the treated polysaccharide material does not have to be heat cured to effect the sizing action of the compounds, although the use of a mild heating step may be preferred. These compounds are also useful for sizing and water-proofing starch and raw natural and modified cellulosic material such as cotton, and various textile materials including cellulose containing filaments, fibers, yarns, and fabrics. These materials are particularly valuable because they provide good permanent sizing and water-proofing properties that rae not removed from the starch or cellulosic substrate by washing. This enhanced sizing and water-proofing effect is believed to be due to the fact that the polyglycidylamines react with the hydroxyl groups of the starch or cellulosic substrate, for example, when applied as the paper product is being made, and effectively cross-link the cellulosic fibers to provide the desired enhanced property.

The compounds may be applied to the paper products according to techniques known to those skilled in the art. For example, the compounds may be applied to finished paper stock directly, in solution, as an emulsion, or in otherwise dispersed form. However, for best results it is preferred to apply, admix, or react the presently claimed compounds with the cellulosic paper stock in the pulp preparation stage in media providing a pH of at least 7, preferably a pH of from 9 to 11, before the pulp is formed into paper sheets, boards, etc. In this manner the sizing of the paper stocks with these compounds is most efficient and effective at low concentration. Concentrations of the sizing agent ranging from 0.01% to 5.0% by weight, based on the weight of the finished paper product, are generally sufficient to provide a permanently sized paper product. Concentration on the order of 0.1 to 1% by weight of the sizing agent, that is, the polyglycidylamine based on the weight of the dry paper pulp are preferred A variety of pulps may be treated with the compounds described above and used to make permanently sized paper according to this invention including bleached and unbleached sulfite pulp, bleached and unbleached kraft pulp, soda pulp, hardwood pulp, and mixtures of ground wood pulp with unbleached kraft pulp and other pulps.

The water-proofing of textile materials is accomplished according to this invention by impregnating the cellulosic textile material comprising cellulose filaments, fibers, fabrics with a solution of the polyglycidylpolyamine compound in an appropriate solvent and then volatilizing off the solvent, for example, by drying and curing, and thereafter subjecting the treated material to elevated temperatures to produce a substantially water insoluble finish on the cellulosic textile. The textile material may be impregnated with from 0.01% to 5% by weight of the polyglycidylpolyamine. The total amount of such polyamine compounds impregnated into the textile material is usually at least 0.075% by weight.

The compositions may be applied to the textile materials in various ways so long as impregnation of the textile materials is obtained. For example, the textile materials may be dipped or immersed in the composition or the composition may be dripped or sprayed on the textile material until the textile material is wetted out with the composition. In order to facilitate the control of deposition of the polyglycidylpolyamine compounds of this invention on the textile material and reduce the drying time, it is desirable to extract the textile material to remove excess solution therefrom. This is suitably accomplished by padding, wringing, squeezing, or hydro-extracting the textile material. The amount of polyglycidylpolyamine compound applied to the textile material is controlled by the degree of extraction used and/or the concentration of these materials in the solution, and may be varied widely depending on the amount of water repellency desired in the textile material. In general, the amount of such ingredients applied is between about 0.01 and 5% by weight, based on the dry textile material, but good practical water repellent effects are obtained on most textiles by applying from about 0.1 to 2% by weight based on the dry textile material.

After the compounds have been applied, in solution, the textile material may then be dried at normal drying temperatures and finally heated at elevated temperatures of about 250 to 360° F. to obtain a water-repellent finish on the textile material. The temperature may be higher than 360° F. depending on the particular textile material, the type and amount of catalyst and the duration of heating is limited only by the stability of the textile material. The duration of heating may vary widely depending primarily on the liquid content and the temperature used but is generally between about 1 and 15 minutes with the longer times corresponding to the lower temperatures. The textile material thus obtained may be given the usual finishing operation such as a refinish wash to remove water-soluble materials, steam framing and the like. Such operations may be desirable, but are not essential.

A large variety of textile materials comprising celllulose fibers may be treated in accordance with the processes of this invention, but the textile material should contain at least 40% by weight of cellulose fibers and probably 60% by weight or more of cellulose fibers. The textile materials treated may be woven or knitted fabrics, referred to generally as fabrics or yarns, filaments or fibers, but it is preferred to treat fabrics. The cellulose fibers may be natural cellulose fibers such as cotton, linen, flax or ramie fibers or regenerated cellulose staple fibers or filaments produced by the viscose or cuprammonium processes. It is preferred, however, to treat cotton fibers or viscose rayon staple fibers or filaments. The preferred textile materials are 100% cotton woven fabrics or 100% viscose rayon woven fabrics or woven fabrics composed entirely of cotton and viscose rayon.

The compounds described above are incorporated into cellulosic substrates in various manners, usually in the form of organic solutions or aqueous emulsions which are prepared according to techniques known in the art. The aqueous emulsions containing one or more of the above described compounds is usually accomplished with one or more of various types of cationic, anionic, or non-ionic emulsifying agents which are known in the art. The solutions and aqueous emulsions of the above compounds may also contain other paper making or textile auxiliaries such as stiffening or bodying agents, softening agents, curing agents, wetting agents, antifoaming agents, and the like, but such agents are not essential.

As examples of stiffening or bodying agents which may be employed may be mentioned aqueous dispersions of water-insoluble thermoplastic vinyl resins such as polyvinyl acetate, polyvinyl chloride, polystyrene, polyalkyl acrylates, polyalkyl methacrylates, vinyl chloride, vinyl acetate copolymers and the like and/or water-soluble thermoplastic resins such as polyvinyl alcohol; water-soluble partially hydrolyzed polyvinyl acetates; water-soluble salts of styrene-maleic anhydride copolymers, styrene-alkyl acid maleate copolymers, vinyl acetate-maleic anhydride copolymers, vinyl acetate-crotonic acid copolymers, vinyl acetate-alkyl acid maleate copolymers; or the like. Generally such agents are employed in amounts of about 0.05 to 5% by weight of the composition.

As examples of softening agents may be mentioned water-soluble alkali metal salts of sulfonated mineral oils, sulfonated fatty alcohols such as sulfonated cetyl and stearyl alcohol, sulfonated castor oil and the like; water-soluble or water-dispersible polyethylene oxides of high molecular weight; the water-soluble reaction products of ethylene oxide or propylene oxide with aryl and aralkyl alcohols or with esters of a fatty acid and sorbitan and the like; cationic type softeners such as cetyl dimethyl benzyl ammonium chloride, or the like. Generally such agents are employed in amounts of 0.05 to 5% by weight of the composition.

As examples of wetting agents which may be used may be mentioned sodium salts of alkylated benzene sulfonates such as sodium decyl benzene sulfonate, sodium dodecyl benzene sulfonate; sodium lauryl sulfate; the sodium salt of methyl stearamide ethionic acid; dioctyl sodium sulfosuccinate; and the like. In general, such agents are employed in amounts of about 0.05 to 3% by weight of the composition.

As examples of anti-foaming agents may be mentioned water-insoluble silicone compounds, water-insoluble oils, water-insoluble alcohols and the like. The amount of such agent used varies with its effectiveness in minimizing foaming, but, in general, amounts of about 0.1 to 5% by weight of the composition may be employed.

The invention is further illustrated by but not limited to, the following examples:

*Example 1*

In 150 ml. of hexane there was dissolved 24.2 g. (0.10 mole) of N-alkyl-1,3-propylenediamine, in which the alkyl groups were derived from coconut oil. To the resulting solution there was added 38.1 g. of epichlorohydrin. This reaction mixture was cooled overnight at 20–25° C. and periodically analyzed to determine the extent of reaction. After 117 hours at 25° C., the reaction mixture was aspirated to remove hexane and excess epichlorohydrin to 25° C./0.2 mm., leaving as residue 49.8 g. of an amber oily product (50.0 g. is theory) mainly of the formula

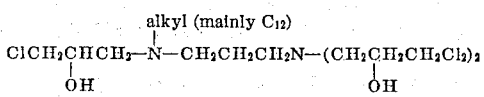

wherein alkyl is an alkyl radical, mainly dodecyl, derived from coconut oil. The product was stored at about −20° to prevent polymerization.

*Example 2*

To 18.5 g. of the diamino-tris(chloropropanol) product obtained in Example 1, in 40 ml. of dimethyl sulfoxide, there was added 10.00 ml. of 9.32 N sodium hydroxide at once. The temperature rose to 35° C. and 20 ml. of water was added. Another 10.00 ml. of 9.32 N sodium hydroxide was added (total of 186.4 milliequivalents) and the mixture was stirred for 1 hour at 25°–35° C. Hexane was added to aid stirring and the excess sodium hydroxide was back-titrated to a pH of about 7 with 2.61 N hydrochloric acid. A total of 39.62 ml. of hydrochloric acid was required (103.4 milliequivalents), which denoted the use of 83.0 milliequivalents of sodium hydroxide to dehydrohalogenate the starting material or 78% of theory for triglycidyl-alkyl-1,3-propylenediamine. The product was isolated by extraction with ether and hexane and, after washing and removal of solvents, weighed 12.0 g., an amber viscous oil.

*Example 3*

In 250 ml. of hexane there was dissolved 64.1 g. (0.20 mole) of melted tallow alkyl (mainly n-$C_{18}$) 1,3-propylenediamine (Armour-"Duomeen T") and cooled to 15° C. At this temperature 111 g. of epichlorohydrin (approximately 2 molar equivalents of epichlorohydrin per amine hydrogen) was added rapidly. The mixture was cooled to 7° C. and stirred overnight for 18 hours allowing the bath to warm to room temperature. The mixture became homogenous as the stirring was continued a total of 42 hours. The reaction mixture was then aspirated below 35° C. to remove hexane, and finally subjected to vacuum of less than 1 mm. for 2 hours to complete the removal of excess epichlorohydrin, leaving 119.3 g. of a viscous amber oil product (theory 119.7 g.) mainly of the formula

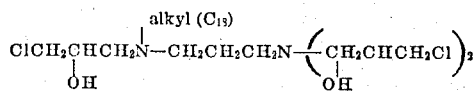

*Example 4*

In about 200 ml. of hexane there was dissolved 49.0 g. (0.15 mole) of pure N-n-octadecyl-1,3-propylenediamine (equivalent weight: 164, found; 163.3, calculated for $C_{21}H_{46}N_2$) aided by gentle heating to 60° C. The solution was cooled to 30° C. at which temperature there was added 52.1 g. (25% excess) of epichlorohydrin. The total weight of the reaction mixture was 229.0 g. After stirring 48.5 hours at 20–25° C. 217.6 g. (95% of the original reaction mixture) was aspirated to a viscous residue, to 25° C. (and finally to 35° C./0.2 mm.) to constant weight (total of 90 minutes) leaving 84.6 g. of a light yellow viscous oil (98.1% of theory) of N,N',N'-tris(3-chloro-2-hydroxypropyl)-N-octadecyl-1,3-propylenediamine, which when treated with aqueous base in dimethyl sulfoxide gave N,N',N' - tris(2,3 - epoxypropyl)-N-octadecyl - 1,3-propylenediamine, having a glycidyl content which was 82% of the theoretical value.

*Example 5*

A mixture of 9.50 g. (0.050 mole) of tetraethylenepentamine, 40.5 g. of epichlorohydrin, and 87.5 g. of methanol solvent was allowed to stand for 43 hours at 20–25°. Aspiration of solvent and excess epichlorohydrin to 30°/0.1 mm. left 36.9 g. of viscous amber product of which 21.3 g. was dissolved in 30 ml. methanol, cooled, and treated with 48.6 ml. of 3.82 N hydrogen chloride in methanol. The resulting hydrochloride was precipitated by slowly adding 250 ml. of ethyl ether to obtain a gummy product. The product was purified by redissolving it in methanol, clarifying with charcoal, filtering off the charcoal, and reprecipitating the amine salt product with ether. The product was aspirated to less than 1 mm. at 30° C. to remove retained solvents. The product had a neutralization equivalent of 243 (theory 204), analyzed as containing 36.63% total chlorine, 17.82% ionic chlorine, corresponding to an average of 4.9 chloropropanol residues and 4.7 hydrochlorides per mole of polyamine as compared with the maximum possible 7 epichlorohydrins and 5 hydrochlorides.

*Example 6*

To 22.8 g. of the crude N-n-octadecyl-1,3-propylenediamine-tris(chloropropanol) of Example 4 in 30 ml. of dimethyl sulfoxide, there was added 20.00 ml. of 5.15 N sodium hydroxide and 20 ml. of water. The mixture was stirred 45 minutes. Back-titrating with 2.61 N hydrochloric acid (4.70 ml. required) indicated a glycidyl equivalent of 81.2% of theory for 100% conversion to N,N',N' - tris(2,3 - epoxypropyl) - N - n-octadecyl-1,3-propylenediamine. The mixture was diluted with water, ether and hexane, the organic product layer was separated, dried over magnesium sulfate, filtered, aspirated to dryness below 25°, down to 0.1 mm., leaving a viscous amber fluid, 16.4 g. or 88% yield, calculated as the triglycidyldiamine.

This isolated product was analyzed by two methods for oxirane oxygen content. The Durbetaki titration (anhydrous hydrobromic acid in glacial acetic acid) indicated 5.30% oxirane oxygen; this figure was obtained after correction for the reagent used by the amine nitrogens. The Ross method gave a direct value of 5.24% oxygen after six hours at 60° in aqueous acetone with continuous neutralization with standard acetic acid. The excellent agreement of the two methods indicated that the product had 54.2–54.7% of maximum glycidyl content when compared to the theoretical 9.70% oxygen. The data illustrate the experimental difficulties of preparing and isolating these highly reactive products; this result is considered the best attainable on a practical preparative scale. Extensive experience with distillable diglycidylamines has shown that, using these same techniques, this type of purity data can be confirmed completely by isolation of pure materials in yields corresponding to the purity found.

*Example 7*

An amine mixture was prepared by adding 106.1 g. (2.0 mole) of acrylonitrile to 53.9 g. (0.20 mole) of n-octadecylamine, heating and stirring at reflux (77° C.) for one hour, then adding 1.0 ml. of 35% methanolic Triton B methoxide (benzyltrimethylammonium methoxide) catalyst, refluxing at 72–75° C. for 6 hours, neutralizing the catalyst with 2 milliliters of acetic acid, concentrating the reaction mixture under aspirator vacuum to 105° C. leaving 76.7 g. of crude product.

This material (37.6 g.) was reduced with 10.0 g. of 95% lithium aluminum hydride in 400 ml. of ethyl ether by stirring until hydrogen evolution stopped, cautiously adding about 20 ml. of water, 7 ml. of 20% sodium hydroxide and then 2.8 ml. more of water, filtering off the crystals (21.6 g. of octadecyl-1,3-propylenediamine), concentrating the filtrate to dryness to obtain an amine mixture, 14.9 g., having a neutralization equivalent of 150.3, indicating that the product was a mixture of 30% N'-n-octadecyldipropylenetriamine and 70% N-octadecyl-1,3-propylenediamine. This (14.2 g.) was dissolved in 100 ml. of hexane and treated with 19.6 g. of epichlorohydrin (25% excess) and kept at 21°–22° C. until the reaction had proceeded to 89% of theory, when two layers had separated. The excess epichlorohydrin and hexane were aspirated off to 30° C./0.1 mm. leaving 26.5 g. of an amber oil, a mixture of the adducts of the starting amines.

*Example 8*

In 100 ml. of hexane there was dispersed 21.6 g. (0.08 mole) of N-dodecyldiethylenetriamine wherein the dodecyl radical is derived from branched-chain tetrapropylene. An additional 50 ml. of hexane was added, the mixture was cooled to 20° C., and then 46.3 g. (0.50 mole) of epichlorohydrin was added rapidly. The reaction mixture became homogeneous when the epichlorohydrin addition had been completed at 15° C. The mixture was stirred for 18 hours. A heavy layer separated, the size of which layer, did not change after 6 hours of additional stirring. The reaction mixture was aspirated and finally stirred at 35° C./1.0 mm. to remove hexane and excess epichlorohydrin; leaving 45.1 g. of an amber viscous oil product. The added weight due to epichlorohydrin reaction was 23.5 g. or 0.254 mole which denotes an addition of 3.17 epichlorohydrin moles per mole of N-dodecyldiethylenetriamine starting material. The product is mainly

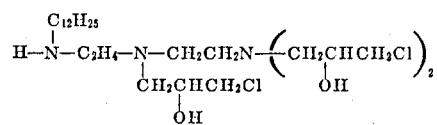

A small sample of this product was analyzed in acetone by treating it with excess 0.0932 N sodium hydroxide to dehydrohalogenate the chloropropanol groups. Upon back-titration with acid, it was found that the sample required 75% of theory for conversion of the chloropropanol groups to glycidyl groups, based on 3 chloropropanol residues per mole of the triamine. Ross analysis of glycidyl content showed 62% of the theoretical 3 per molecule for N-dodecyl N',N'',N''-tris-(2,3-epoxypropyl) diethylenetriamine.

*Example 9*

In 150 ml. of hexane there was dispersed 27.0 g. (0.10 mole) of N-keryldiethylenetriamine (assumed mol. wt. 269.46) prepared from a chlorinated kerosene averaging $C_{12}$. The mixture was cooled to 20° C., and treated with 46.3 g. (0.50 mole) of epichlorohydrin, added rapidly. The mixture was stirred for 68 hours then evaporated under aspirator vacuum to low volume. At 15° C. the product formed a heavy layer. The mixture was further concentrated in a rotary evaporator at less than 25° C./1 mm. for a total of 4.5 hours leaving 58.7 g. of viscous amber oil as product mainly N-keryl (averaging $C_{12}$) N',N'',N'' - tris(3 - chloro-2-hydroxypropyl)diethylenetriamine, containing an average of 3.43 chloropropanol moles per mole of the N-keryldiethylenetriamine starting material. The product was stored in a deep-freeze to prevent further reaction.

A portion of the product was later converted to the corresponding glycidylamine product requiring 68.3% of the alkali expected for 3 glycidyl groups per molecule.

*Example 10*

In 150 g. of methanol there was dissolved 14.6 g. (0.1 mole) of triethylenetetramine. The mixture was cooled to 5–10° C. and treated with 69.4 g. (0.75 mole) of epichlorohydrin (25% molar excess). The resulting reaction mixture was allowed to warm to room-temperature (20°–25° C.) in an ice bath. The mixture was allowed to stand for 76 hours, and was periodically sampled to determine the extent of reaction and then all but 15 ml. of the reaction mixture was cooled to −20° C. to stop the reaction. The mixture was later warmed and concentrated below 30° C./0.1 mm. to obtain 68.3 g. (99% of theory) of a viscous pentakis(3-chloro-2-hydroxypropyl)triethylenetetramine.

A 35.3 g. portion of this product was redissolved in about 50 ml. of methanol by shaking at room temperature, kept below 25° C., and treated with 65.5 ml. of 3.82 N hydrogen chloride (0.25 mole of HCl) in methanol. The mixture was allowed to stand for 2 days and then aspirated to a viscous residue which was washed with 200 ml. of dry ethyl ether to purify the product. The product was aspirated to remove ethyl ether finally to less than 30° C./0.5 mm. The dried product was broken up, redried at 1 mm. leaving 38.7 g. of penta(3-chloro-2-hydroxypropyl)triethylenetetramine tetrahydrochloride, which analyzed as containing 39.13% total chlorine, 17.14% ionic chlorine, 6.74% nitrogen corresponding to 5.0 3-chloro-2-hydroxypropyl groups and 4.4 hydrochloride groups per mole of triethylenetetramine starting material, as compared with the maximum possible 6 3-chloro-2-hydroxypropyl groups and 4 hydrochloride groups per mole of the triethylenetetramine.

Example 11

This example illustrates the utility of the compounds of this invention as cellulose modifying agents. For this example the compounds were tested as paper-sizing agents according to various sizing methods:

The following compounds were tested according to one or more of the described sizing methods:

(1) N-n-octadecyl-N,N',N'-tris(3-chloro-2-hydroxypropyl)-1,3-propylenediamine,
(2) N-(tallow alkyl mainly $C_{18}$)-N,N',N'-tris(3-chloro-2-hydroxypropyl)-1,3-propylenediamine,
(3) N-(n-octadecyl)-N,N',N'-tris(2,3-epoxypropyl)-1,3-propylenediamine.

The tests used were as follows:

*Solvent dip.*—Dissolve 0.5 g. of the test compound in 100 ml. of xylene, dip strips of Whatman No. 1 filter paper into this solution. The concentration and pickup of the solution is such that the treated paper has 0.35% by weight of the test compound thereon, after drying.

*Wet end method.*—In 5 ml. of xylene there is dissolved 0.75 g. of the test compound. The resulting solution is emulsified with 20 ml. of 0.1% hexadecyltrimethylammonium bromide, and this mixture is added to bleached refined Gatineau sulfite pulp. The thus treated pulp is made basic with alkali to pH 9 and hand sheets of paper are made from the treated pulp on the Noble-Wood machine. The dried paper directly from the machine is termed "off machine" paper. Cured samples of the treated paper are prepared by heating "off machine" paper in an oven for 60 minutes at 105° C.

The treated papers, prepared by any one of the above described methods are then tested according to the standard ink penetration test in which the time, in seconds, required for ink to penetrate through the paper floating on the surface of the ink bath is noted.

Samples of the treated papers are washed in chloroform for at least one hour, dried, and then tested in a similar manner in the ink penetration test.

Some of the treated paper strips which were allowed to age or cure at room temperature for 29 to 38 days were also tested.

The results were as follows:

| Compound | Percent | Method of Application | Cure | | Sizing Unwashed | $CHCl_3$ Washed |
|---|---|---|---|---|---|---|
| | | | Time (Min.) | Temp. (° C.) | | |
| 1 | 0.35 | Wet End | 60 | 105 | 2,500 | 4,500 |
| 2 | 1.0 | Wet End (cold solvent) | 60 | 105 | 2,500 | 4,500 |
| 3a | 0.35 | Solvent Dip | (¹) | (¹) | 3,200 | >1,500 |
| b | 0.35 | Above paper stood 38 days at room temperature. | (¹) | (¹) | 1,800 | 1,700 |
| c | 0.35 | Wet End, paper stood 29 days at room temperature. | (¹) | (¹) | >500 | 7,800 |

¹ Off machine.

The hydrochloride salt of N-(tallow alkyl-mainly $C_{18}$)-N,N',N'-tris(3-chloro-2-hydroxypropyl)-1,3-propylenediamine was prepared by adding twice the stoichiometric amount of aqueous hydrochloric acid needed to form the dichloride salt. The mixture was stirred overnight to obtain a dispersion of solid material in water. This dispersion was added to bleached refined Gatineau sulfite pulp containing 100 ml. of a pH buffer (NaOH, KCl, $H_3BO_3$), and additional sodium hydroxide was added to neutralize all hydrogen chloride present. The pH of the pulp before the hydrochloride salt was added was 9.05. After neutralization the pH was 8.3. Chloroform was used to wash the paper for 1 hour.

In the ink penetration test of such salt treated paper sheets, the "off machine" samples resisted ink penetration for 4200 seconds, after washing. Samples of such paper cured at 105° C., for 60 minutes gave 8200 sec., before washing, and 12,000 seconds, after chloroform washing. Cured samples of such paper prepared using triethylenediamine as a catalyst showed greater than 5500 seconds before washing, and 19,300 seconds after chloroform washing.

Another sample of the same N-(tallow alkyl-mainly $n$-$C_{18}$) - N,N',N'-tris(2,3-epoxypropyl)-1,3-propylenetriamine·hydrochloride salt sizing composition as a dispersion was added to pulp containing 100 ml. of pH 9 buffer plus enough sodium hydroxide to neutralize all of the hydrochloride present and leave a pulp of pH 9.1 after hydrochloride neutralization. "Off machine" samples of paper formed from such pulp were tested for ink penetration and gave 4800 seconds, after washing with chloroform. Cured samples (105° C./60 minutes) gave 12,000 seconds, after washing, and cured samples catalyzed with triethylenediamine gave 18,300 sec. after washing with chloroform.

Control samples of paper treated with solutions having all of the ingredients except the test compounds in each of the above tests were all instantaneously penetrated in the ink penetration test.

Example 12

To 10.3 g. (0.1 mole) of diethylenetriamine dissolved in 125 g. of methanol, and cooled to 5–10° C., there was added 57.8 g. of epichlorohydrin (0.625 mole). The mixture was stirred, allowed to warm slowly to 20–25° C., and sampled periodically to determine the extent of reaction. The reaction was allowed to proceed for 3 days during which time reaction proceeded to 104.6% of the theoretical amount for the addition of 5 moles epichlorohydrin per mole of amine. The reaction mixture was stored overnight in deep freeze (−20° C.) and then aspirated to 30° C./1 mm. to remove methanol and excess epichlorohydrin, leaving 55.2 (100% theoretical yield) of a very light yellow viscous oily gum. The product had a glycidyl equivalent of 65.5% of the theoretical (NaOH back-titration method) and a glycidyl content of 52% of theory (Ross method). A portion of the product was dissolved in methanol and treated with hydrochloric acid as described in Example 5 to prepare the hydrochloride salt thereo. The hydrochloride product analyzed as containing 37.56% total chlorine, 14.66% ionic chlorine, which corresponds to 5.3 moles of chloropropanol and 2.8 moles hydrogen chloride per mole of diethylenetriamine, as compared with 5 moles of chloropropanol and 3 moles of hydrogen chloride for penta(3-chloro-2-hydroxypropyl)diethylenetriamine trihydrochloride.

I claim:
1. A compound of the formula

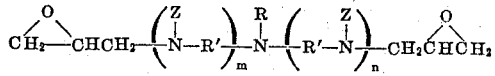

wherein R is selected from the group consisting of alkyl radicals having from 10 to 25 carbon atoms, alkenyl having from 10 to 25 carbon atoms, alkyl-substituted phenyl, and biphenylyl radicals having from 10 to 25 carbon atoms in the alkyl substituents; R' is a bivalent alkylene radical having from 2 to 6 carbon atoms; $n$ plus $m$ equals a whole number of from 1 to 6, $n$ is a whole number of at least 1, $m$ is a whole number of from 0 to 5; Z is selected from the group consisting of hydrogen and the radical

and at least 50% of the Z radicals are the radical

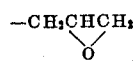

2. A compound according to claim 1 wherein R is an alkyl radical having from 10 to 25 carbon atoms.

3. N - dodecyl-N,N',N'-tris(2,3-epoxypropyl)-diethylenetriamine.

4. N-n-octadecyl - N,N',N' - tris(2,3-epoxypropyl)-1,3-propylenediamine.

References Cited by the Examiner

UNITED STATES PATENTS

| | | | |
|---|---|---|---|
| 2,252,039 | 8/1941 | Schirm | 260—348 X |
| 2,282,701 | 5/1942 | Bock et al. | 117—143 X |
| 2,406,990 | 9/1946 | Borden et al. | 117—154 |
| 2,595,935 | 5/1952 | Daniel et al. | 92—3 |
| 2,694,629 | 11/1954 | Reynolds. | |
| 2,726,164 | 12/1955 | Eichmeier | 117—5.1 |
| 2,841,595 | 7/1958 | Pezzaglia | 260—348.6 |
| 2,884,406 | 4/1959 | Wegler et al. | 260—348 X |
| 2,891,970 | 6/1959 | Frank et al. | 260—348.6 |
| 2,913,496 | 11/1959 | Cluff | 260—584 |
| 2,694,629 | 11/1954 | Reynolds. | |
| 2,953,579 | 9/1960 | Williams et al. | 260—348 |
| 2,969,302 | 1/1961 | Green | 162—164 |
| 3,031,505 | 4/1962 | Pollitzer | 260—584 |
| 3,050,437 | 8/1962 | Arlt | 162—158 |
| 3,084,092 | 4/1963 | Arlt | 162—158 |

FOREIGN PATENTS

| | | |
|---|---|---|
| 933,219 | 12/1947 | France. |
| 955,835 | 1/1957 | Germany. |
| 1,132,146 | 6/1962 | Germany. |

OTHER REFERENCES

McKelvey et al.: Jour. Org. Chem., vol. 24, pp. 614–616 (1959).

McKelvey et al.: Jour. Org. Chem., vol. 25, pp. 1424–1428 (1960).

WALTER MODANCE, *Primary Examiner.*

NICHOLAS S. RIZZO, *Examiner.*

J. P. FRIEDENSON, N. S. MILESTONE,
*Assistant Examiners.*